United States Patent
Shaffer et al.

(10) Patent No.: US 9,541,305 B2
(45) Date of Patent: Jan. 10, 2017

(54) WATER HEATER APPLIANCE AND A METHOD FOR OPERATING A WATER HEATER APPLIANCE

(71) Applicant: General Electric Company, Schenectady, NY (US)

(72) Inventors: Timothy Scott Shaffer, La Grange, KY (US); Michael Thomas Beyerle, Pewee Valley, KY (US)

(73) Assignee: Haier US Appliance Solutions, Inc., Wilmington, DE (US)

( * ) Notice: Subject to any disclaimer, the term of this patent is extended or adjusted under 35 U.S.C. 154(b) by 379 days.

(21) Appl. No.: 14/146,234

(22) Filed: Jan. 2, 2014

(65) Prior Publication Data

US 2015/0184889 A1 Jul. 2, 2015

(51) Int. Cl.
  F24H 9/20 (2006.01)
  G05D 23/19 (2006.01)
  F24H 4/04 (2006.01)

(52) U.S. Cl.
  CPC .............. *F24H 9/2021* (2013.01); *F24H 4/04* (2013.01); *G05D 23/1919* (2013.01); *F24D 2200/123* (2013.01)

(58) Field of Classification Search
  CPC ...... F24H 9/2021; F24H 4/04; G05D 23/1919; F24D 2200/123
  USPC ............... 392/308, 441, 465, 449, 454, 457, 461,392/464; 237/2 B; 219/201, 494, 490, 492, 497, 219/483–486
  See application file for complete search history.

(56) References Cited

U.S. PATENT DOCUMENTS

| | | | | |
|---|---|---|---|---|
| 5,596,952 A | * | 1/1997 | Lannes | F24D 3/082 122/14.1 |
| 5,906,109 A | * | 5/1999 | Dieckmann | F24H 4/04 237/2 B |
| 7,225,629 B2 | | 6/2007 | Concha et al. | |
| 7,334,419 B2 | * | 2/2008 | Gordon | F24H 4/04 62/238.7 |
| 8,165,726 B2 | | 4/2012 | Nordberg et al. | |
| 8,422,870 B2 | | 4/2013 | Nelson et al. | |
| 2002/0125241 A1 | * | 9/2002 | Scott | A47J 31/56 219/492 |
| 2002/0146241 A1 | * | 10/2002 | Murahashi | F24H 1/18 392/308 |
| 2006/0213210 A1 | * | 9/2006 | Tomlinson | F24H 4/04 62/238.6 |
| 2007/0157634 A1 | * | 7/2007 | Hartge | F24H 9/2021 62/62 |
| 2010/0209084 A1 | * | 8/2010 | Nelson | F24H 4/04 392/465 |
| 2010/0257882 A1 | * | 10/2010 | Penev | F24D 17/0021 62/235.1 |
| 2011/0058795 A1 | * | 3/2011 | Kleman | F24H 4/04 392/308 |

(Continued)

*Primary Examiner* — David Angwin
*Assistant Examiner* — Biniam Asmelash
(74) *Attorney, Agent, or Firm* — Dority & Manning, P.A.

(57) ABSTRACT

A water heater appliance and method for operating a water heater appliance are provided. The method includes measuring a temperature of water within the water heater appliance, operating a heating element of the water heater appliance if the temperature of water within the water heater appliance is less than a threshold temperature and deactivating the heating element of the water heater appliance when the temperature of water within the water heater appliance exceeds the threshold temperature.

7 Claims, 4 Drawing Sheets

(56) References Cited

U.S. PATENT DOCUMENTS

| | | | |
|---|---|---|---|
| 2012/0024240 A1* | 2/2012 | Beckley | F24H 1/18 |
| | | | 122/14.2 |
| 2012/0067860 A1* | 3/2012 | Broniak | F24D 19/1063 |
| | | | 219/201 |
| 2012/0312043 A1* | 12/2012 | Kim | F24D 11/0221 |
| | | | 62/235.1 |

* cited by examiner

WATER HEATER APPLIANCE AND A METHOD FOR OPERATING A WATER HEATER APPLIANCE

FIELD OF THE INVENTION

The present subject matter relates generally to water heater appliances, such as heat pump water heater appliances, and methods for operating the same.

BACKGROUND OF THE INVENTION

Certain water heaters operate such that water with the water heater's tank is maintained at a set temperature. Generally, a user can select the set temperature using a dial or other input on the water heater. Heat pump water heaters are gaining broader acceptance as a more economic and ecologically-friendly alternative to electric water heaters. Heat pump water heaters include a sealed system for heating water to the set temperature. Certain heat pump water heaters also include a supplemental heating element for heating water. Sealed systems generally heat water less quickly than the supplemental heating elements. However, supplemental heating elements generally heat water less efficiently than the sealed systems.

The sealed systems and the supplemental heating elements are operated in a variety of manners depending upon the current heating mode of the associated water heater appliance. For example, during a vacation mode, neither the sealed system nor the supplemental heating elements are operated. Vacation modes can correspond to when water within the water heater appliance is at the set temperature and/or when the water heater appliance is deactivated by a user. As another example, during an electric heating mode, only the supplemental heating elements are activated and the sealed system is deactivated. A user can select the electric heating mode when the user desires water to be heated rapidly by the water heater appliance. During a heat pump mode, only the sealed system is used to heat water within the water heater appliance. As discussed above, the heat pump mode can heat water efficiently but can also heat water more slowly than the electric mode.

During hybrid heating operations, both the sealed system and the supplemental heating element are used to heat water. Hybrid heating operations are generally initiated when a temperature of water within the water heater falls below a threshold temperature, such as after large water draw events. The sealed system and the supplemental heating element are generally operated simultaneously until the temperature of water within the water heater is restored to the set temperature. Hybrid heating operations can assist with rapidly heating water within the water heater after large water draw events. However, operating both the sealed system and the supplemental heating element consumes valuable energy and can negatively affect an efficiency of the water heater.

Accordingly, methods for operating a water heater appliance efficiently would be useful. In particular, methods for operating a heat pump water heater appliance efficiently during hybrid heating operations would be useful.

BRIEF DESCRIPTION OF THE INVENTION

The present subject matter provides a water heater appliance and method for operating the same. The method includes measuring a temperature of water within the water heater appliance, operating a heating element of the water heater appliance if the temperature of water within the water heater appliance is less than a threshold temperature and deactivating the heating element of the water heater appliance when the temperature of water within the water heater appliance exceeds the threshold temperature. Additional aspects and advantages of the invention will be set forth in part in the following description, or may be apparent from the description, or may be learned through practice of the invention.

In a first exemplary embodiment, a method for operating a water heater appliance during a hybrid heating mode is provided. The method includes measuring a temperature of water within the water heater appliance, activating a sealed system of the water heater appliance if the temperature of water within the water heater appliance is less than a set temperature at the step of measuring, operating a heating element of the water heater appliance if the temperature of water within the water heater appliance is less than a threshold temperature at the step of measuring, and deactivating the heating element of the water heater appliance when the temperature of water within the water heater appliance exceeds the threshold temperature after the step of operating.

In a second exemplary embodiment, a water heater appliance is provided. The water heater appliance includes a tank that defines an interior volume. A heating element is mounted to the tank and is configured for heating water within the interior volume of the tank. The water heater appliance also includes a sealed system. The sealed system includes a compressor, a condenser and an evaporator. The compressor is operable to compress refrigerant. The condenser is in fluid communication with the compressor such that refrigerant from the compressor is received by the condenser. The condenser is configured for heating water within the interior volume of the tank with energy from the refrigerant. A temperature sensor is configured for measuring a temperature of water within the interior volume of the tank. The water heater appliance also includes a controller that is in operative communication with the heating element, the compressor and the temperature sensor. The controller is configured for measuring a temperature of water within the interior volume of the tank with the temperature sensor, activating the compressor if the temperature of water within the interior volume of the tank is less than a set temperature at the step of measuring, operating the heating element if the temperature of water within the interior volume of the tank is less than a threshold temperature at the step of measuring, and deactivating the heating element of the water heater appliance when the temperature of water within the interior volume of the tank exceeds the threshold temperature after the step of operating.

These and other features, aspects and advantages of the present invention will become better understood with reference to the following description and appended claims. The accompanying drawings, which are incorporated in and constitute a part of this specification, illustrate embodiments of the invention and, together with the description, serve to explain the principles of the invention.

BRIEF DESCRIPTION OF THE DRAWINGS

A full and enabling disclosure of the present invention, including the best mode thereof, directed to one of ordinary skill in the art, is set forth in the specification, which makes reference to the appended figures.

DETAILED DESCRIPTION

Reference now will be made in detail to embodiments of the invention, one or more examples of which are illustrated in the drawings. Each example is provided by way of explanation of the invention, not limitation of the invention. In fact, it will be apparent to those skilled in the art that various modifications and variations can be made in the present invention without departing from the scope or spirit of the invention. For instance, features illustrated or described as part of one embodiment can be used with another embodiment to yield a still further embodiment. Thus, it is intended that the present invention covers such modifications and variations as come within the scope of the appended claims and their equivalents.

Figure 1:
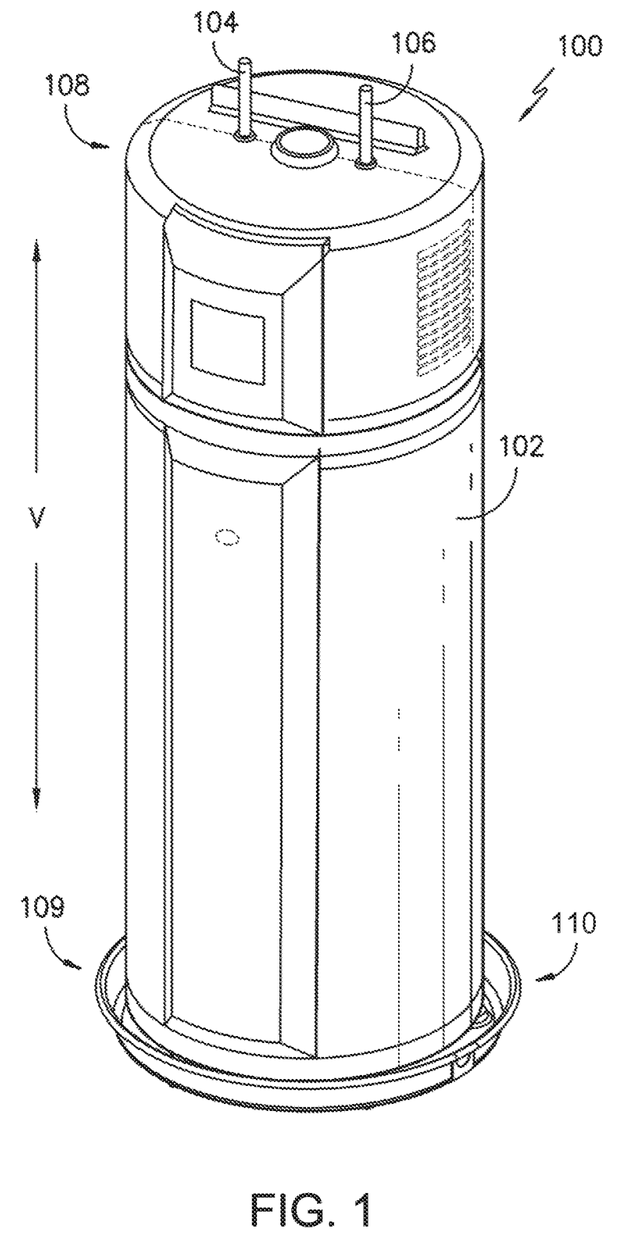
FIG. 1 provides a perspective view of a water heater appliance according to an exemplary embodiment of the present subject matter.
Figure 2:
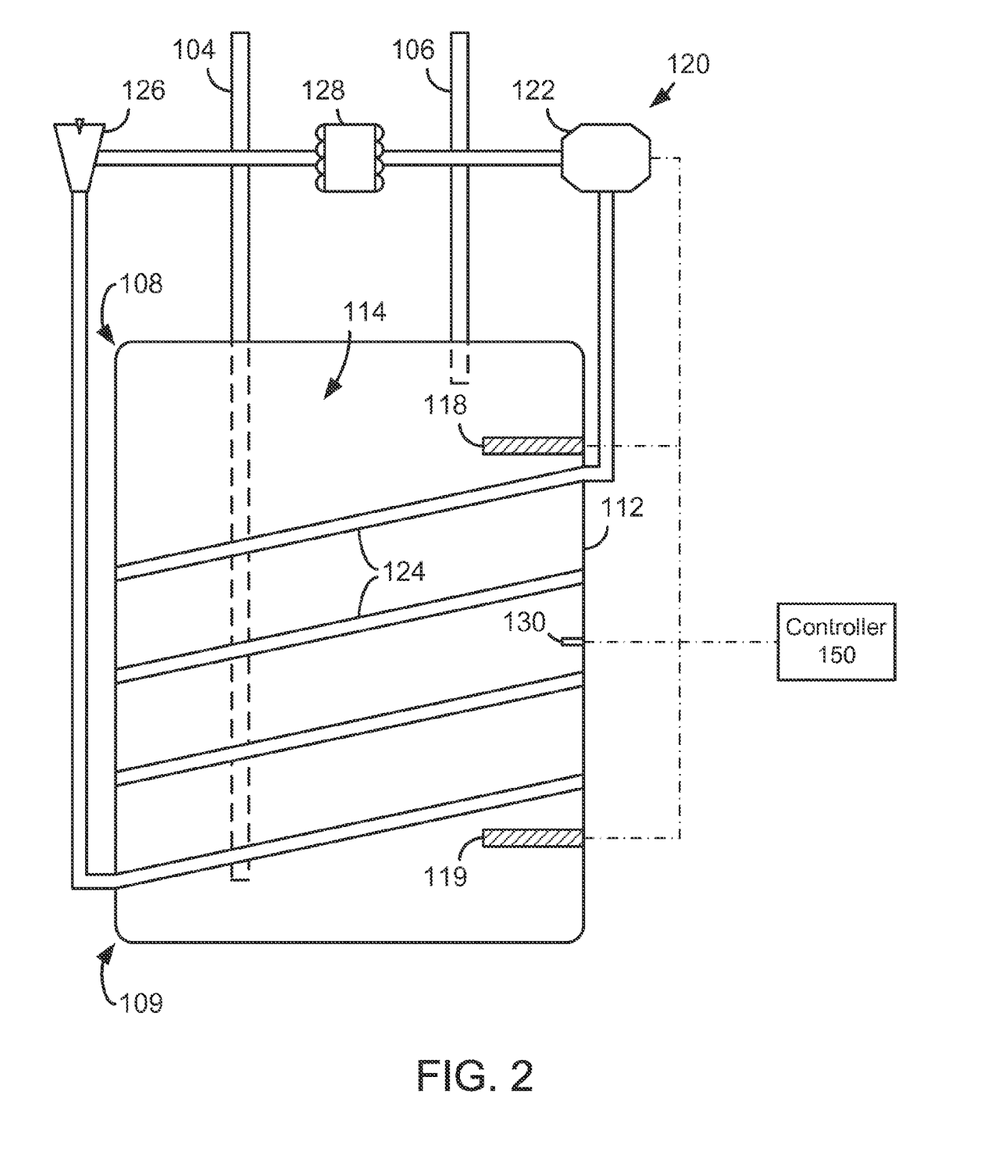
FIG. 2 provides a schematic view of certain components of the exemplary water heater appliance of FIG. 1.

FIG. 1 provides a perspective view of a water heater appliance 100 according to an exemplary embodiment of the present subject matter. FIG. 2 provides a schematic view of certain components of water heater appliance 100. Water heater appliance 100 includes a casing 102. A tank 112 (FIG. 2) is mounted within casing 102. Tank 112 defines an interior volume 114 for heating water therein.

Water heater appliance 100 also includes a cold water conduit 104 and a hot water conduit 106 that are both in fluid communication with tank 112 within casing 102. As an example, cold water from a water source, e.g., a municipal water supply or a well, enters water heater appliance 100 through cold water conduit 104. From cold water conduit 104, such cold water enters interior volume 114 of tank 112 wherein the water is heated to generate heated water. Such heated water exits water heater appliance 100 at hot water conduit 106 and, e.g., is supplied to a bath, shower, sink, or any other suitable feature.

As may be seen in FIG. 1, water heater appliance 100 extends between a top portion 108 and a bottom portion 109 along a vertical direction V. Thus, water heater appliance 100 is generally vertically oriented. Water heater appliance 100 can be leveled, e.g., such that casing 102 is plumb in the vertical direction V, in order to facilitate proper operation of water heater appliance 100.

A drain pan 110 is positioned at bottom portion 109 of water heater appliance 100 such that water heater appliance 100 sits on drain pan 110. Drain pan 110 sits beneath water heater appliance 100 along the vertical direction V, e.g., to collect water that leaks from water heater appliance 100 or water that condenses on an evaporator 128 of water heater appliance 100. It should be understood that water heater appliance 100 is provided by way of example only and that the present subject matter may be used with any suitable water heater appliance.

Turning now to FIG. 2, water heater appliance 100 includes an upper heating element 118 and a lower heating element 119 and a sealed system 120 for heating water within interior volume 114 of tank 112. Thus, water heater appliance 100 is commonly referred to as a "heat pump water heater appliance." Upper and lower heating elements 118 and 119 can be any suitable heating elements. For example, upper heating element 118 and/or lower heating element 119 may be an electric resistance element, a microwave element, an induction element, or any other suitable heating element or combination thereof. Lower heating element 119 may also be a gas burner.

Sealed system 120 includes a compressor 122, a condenser 124, a throttling device 126 and an evaporator 128. Condenser 124 is assembled in a heat exchange relationship with tank 112 in order to heat water within interior volume 114 of tank 112 during operation of sealed system 120. During operation of sealed system 120, refrigerant exits evaporator 128 as a fluid in the form of a superheated vapor and/or high quality vapor mixture. Upon exiting evaporator 128, the refrigerant enters compressor 122 wherein the pressure and temperature of the refrigerant are increased such that the refrigerant becomes a superheated vapor. The superheated vapor from compressor 122 enters condenser 124 wherein it transfers energy to the water within tank 112 and condenses into a saturated liquid and/or high quality liquid vapor mixture. This high quality/saturated liquid vapor mixture exits condenser 124 and travels through throttling device 126. Upon exiting throttling device 126, the pressure and temperature of the refrigerant drop at which time the refrigerant enters evaporator 128 and the cycle repeats itself.

Water heater appliance 100 also includes a temperature sensor 130. Temperature sensor 130 is configured for measuring a temperature of water within interior volume 114 of tank 112. Temperature sensor 130 can be positioned at any suitable location within water heater appliance 100. For example, temperature sensor 130 may be positioned within interior volume 114 of tank 112 or may be mounted to tank 112 outside of interior volume 114 of tank 112. When mounted to tank 112 outside of interior volume 114 of tank 112, temperature sensor 130 can be configured for indirectly measuring the temperature of water within interior volume 114 of tank 112. For example, temperature sensor 130 can measure the temperature of tank 112 and correlate the temperature of tank 112 to the temperature of water within interior volume 114 of tank 112. Temperature sensor 130 can be any suitable temperature sensor. For example, temperature sensor 130 may be a thermocouple or a thermistor.

Water heater appliance 100 further includes a controller 150 that is configured for regulating operation of water heater appliance 100. Controller 150 is in, e.g., operative, communication with upper and lower heating elements 118 and 119, compressor 122 and temperature sensor 130. Thus, controller 150 can selectively activate upper and lower heating elements 118 and 119 and/or compressor 122 in order to heat water within interior volume 114 of tank 112.

Controller 150 includes memory and one or more processing devices such as microprocessors, CPUs or the like, such as general or special purpose microprocessors operable to execute programming instructions or micro-control code associated with operation of water heater appliance 100. The memory can represent random access memory such as DRAM, or read only memory such as ROM or FLASH. The processor executes programming instructions stored in the memory. The memory can be a separate component from the processor or can be included onboard within the processor. Alternatively, controller 150 may be constructed without using a microprocessor, e.g., using a combination of discrete analog and/or digital logic circuitry (such as switches, amplifiers, integrators, comparators, flip-flops, AND gates, and the like) to perform control functionality instead of relying upon software.

Controller 150 can operate upper heating element 118, lower heating element 119 and/or compressor 122 in order to heat water within interior volume 114 of tank 112. As an example, a user can select or establish a set-point temperature for water within interior volume 114 of tank 112, or the set-point temperature for water within interior volume 114 of tank 112 may be a default value. Based upon the set-point temperature for water within interior volume 114 of tank 112, controller 150 can selectively activate upper heating element 118, lower heating element 119 and/or compressor 122 in order to heat water within interior volume 114 of tank 112 to the set-point temperature for water within interior volume 114 of tank 112. The set-point temperature for water within interior volume 114 of tank 112 can be any suitable temperature. For example, the set-point temperature for water within interior volume 114 of tank 112 may be between about one hundred degrees Fahrenheit and about one hundred and eighty-degrees Fahrenheit.

As will be understood by those skilled in the art, interior volume 114 of tank 112 can hold a limited amount of heated water. During flow events, heated water is drawn from interior volume 114 of tank 112 and replaced with relatively cool water from cold water conduit 104. Upper heating element 118, lower heating element 119 and/or sealed system 120 can be used to heat such relatively cool water to the set-point temperature. Water heater appliance 100 includes features for heating such relatively cool water efficiently and/or economically. As discussed in greater detail below, during a hybrid heating operation of water heater appliance 100, upper heating element 118 and/or lower heating element 119 are operated to heat water in interior volume 114 of tank 112 if the temperature of water within interior volume 114 of tank 112 is less than a threshold temperature. Upper heating element 118 and/or lower heating element 119 are deactivated when the temperature of water within interior volume 114 of tank 112 exceeds the threshold temperature while sealed system 120 continues to operate and heat water within interior volume 114 of tank 112 to the set-point temperature.

The threshold temperature can be any suitable temperature. For example, the threshold temperature may greater than about one hundred degrees Fahrenheit and less than about one hundred and forty degrees Fahrenheit. As another example, the threshold temperature may be about one hundred and twenty degrees Fahrenheit. In addition, the threshold temperature may be less than the set-point temperature. In particular, the threshold temperature may correspond to a temperature of water within interior volume 114 of tank 112 that is less than the set-point temperature but still generally acceptable to a user of water heater appliance 100.

Figure 3:
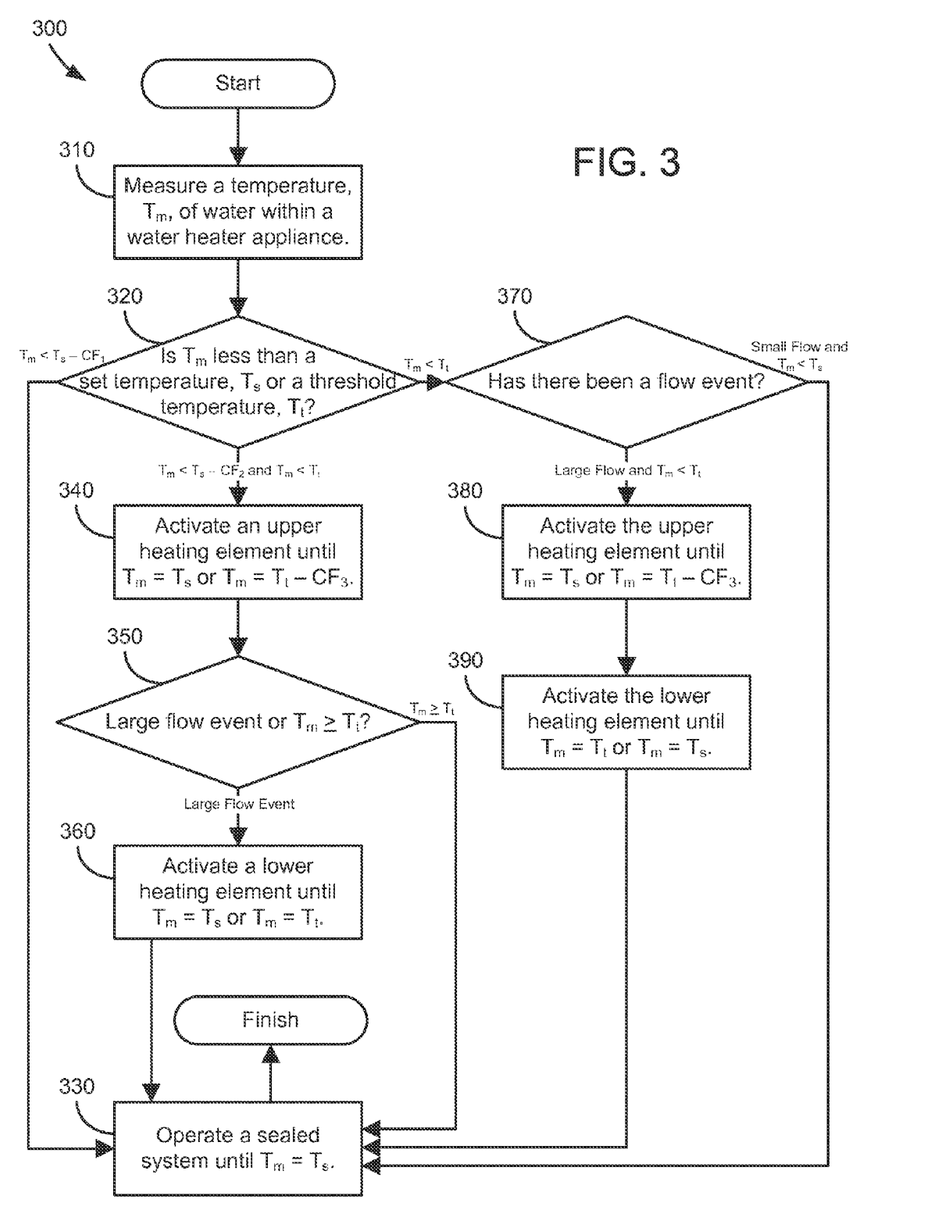
FIG. 3 illustrates a method for operating a water heater appliance according to an exemplary embodiment of the present subject matter.

FIG. 3 illustrates a method 300 for operating a water heater appliance a during a hybrid heating mode according to an exemplary embodiment of the present subject matter. Method 300 can be used to operate any suitable water heater appliance. For example, method 300 may be used to operate water heater appliance 100 (FIG. 1). Controller 150 may be programmed or configured to implement method 300. Utilizing method 300, water heater appliance 100 can be operated efficiently and/or economically, e.g., during a hybrid heating operation of water heater appliance 100.

At step 310, a temperature, $T_m$, of water within interior volume 114 of tank 112 is measured. As an example, controller 150 can measure the temperature $T_m$ of water within interior volume 114 of tank 112 with temperature sensor 130 at step 310. Thus, controller 150 can receive a signal from temperature sensor 130 at step 310 corresponding to the temperature $T_m$ of water within interior volume 114 of tank 112.

At step 320, controller 150 establishes whether the temperature $T_m$ of water within interior volume 114 of tank 112 is greater than a set temperature, $T_s$, of water heater appliance 100 and/or a threshold temperature, $T_t$, of water heater appliance 100. The set temperature $T_s$ can be any suitable temperature. For example, the set temperature $T_s$ may be greater than about one hundred degrees Fahrenheit and less than about one hundred and eighty-degrees Fahrenheit. The threshold temperature $T_t$ can also be any suitable temperature. For example, the threshold temperature $T_t$ may be greater than about one hundred degrees Fahrenheit and less than about one hundred and forty-degrees Fahrenheit. In certain exemplary embodiments, the set temperature $T_s$ is greater than the threshold temperature $T_t$.

At step 330, sealed system 120 is operated in order to heat water within interior volume 114 of tank 112. As an example, controller 150 can operate or activate compressor 122 at step 330 in order supply compressed refrigerant to condenser 124 and heat water within interior volume 114 of tank 112. Sealed system 120 is operated at step 330 if the temperature $T_m$ of water within interior volume 114 of tank 112 is less than a difference between the set temperature $T_s$ and a first temperature offset, $CF_1$, at step 320. The first temperature offset $CF_1$ can be any suitable temperature. For example, the first temperature offset $CF_1$ may be about five degrees Fahrenheit, about seven degrees Fahrenheit or about ten degrees Fahrenheit. Controller 150 can continue to operate sealed system 120 at step 330 until the temperature $T_m$ of water within interior volume 114 of tank 112 is about equal to or exceeds the set temperature $T_s$. Upper heating element 118 and lower heating element 119 are deactivated or turned off at step 330.

At step 340, upper heating element 118 is activated or operated in order to heat water within interior volume 114 of tank 112. As an example, controller 150 can operate or activate upper heating element 118 at step 340 in order heat water within interior volume 114 of tank 112. Upper heating element 118 is activated at step 340 if the temperature $T_m$ of water within interior volume 114 of tank 112 is less than a difference between the set temperature $T_s$ and a second temperature offset, $CF_2$, and/or if the temperature $T_m$ of water within interior volume 114 of tank 112 is less than the threshold temperature $T_t$ at step 320. The second temperature offset $CF_2$ can be any suitable temperature. For example, the second temperature offset $CF_2$ may be about twenty degrees Fahrenheit, about thirty degrees Fahrenheit or about forty degrees Fahrenheit. Controller 150 can continue to operate upper heating element 118 at step 340 until the temperature $T_m$ of water within interior volume 114 of tank 112 is about equal to or exceeds the set temperature $T_s$ and/or a difference between the threshold temperature $T_t$ and a third temperature offset, $CF_3$. The third temperature offset $CF_3$ can be any suitable temperature. For example, the third temperature offset $CF_3$ may be about five degrees Fahrenheit, about seven degrees Fahrenheit or about ten degrees Fahrenheit. Sealed system 120 may also be activated or operated at step 340 in order to assist with heating water within interior volume 114 of tank 112.

At step 350, controller 150 determines whether a large flow event is occurring or whether the temperature $T_m$ of water within interior volume 114 of tank 112 reaches the threshold temperature $T_t$, e.g., during step 340. As an example, if a large flow event has occurred, controller 150 operates or activates lower heating element 119 (e.g., and deactivates upper heating element 118) at step 360 to heat water within interior volume 114 of tank 112. Controller 150 can continue to operate lower heating element 119 at step 360 until the temperature $T_m$ of water within interior volume 114 of tank 112 is about equal to or exceeds the threshold temperature $T_t$ and/or the set temperature $T_s$. Sealed system 120 may also be activated or operated at step 360 in order to assist with heating water within interior volume 114 of tank 112. After step 360, sealed system 120 is operated at step 330 until water within interior volume 114 of tank 112 reaches the set temperature $T_s$. Similarly, if the temperature $T_m$ of water within interior volume 114 of tank 112 is equal to or exceeds the threshold temperature $T_t$ at step 360, sealed system 120 is operated in order to heat water within interior volume 114 of tank 112 at step 330. As discussed above, upper heating element 118 and lower heating element 119 are deactivated or turned off at step 330.

At step 370, controller 150 determines whether a flow event has occurred. A large flow event can correspond to an event where more than about twenty gallons of water is dispensed from interior volume 114 of tank 112 over a period of about ten minutes. Conversely, a small flow event can correspond to an event where less than about ten gallons of water is dispensed from interior volume 114 of tank 112 over a period of about ten minutes. If a large flow event has occurred and/or the temperature $T_m$ of water within interior volume 114 of tank 112 is less than the threshold temperature $T_t$ at step 370, controller 150 activates upper heating element 118 at step 380. Controller 150 can continue to operate upper heating element 118 at step 380 until the temperature $T_m$ of water within interior volume 114 of tank 112 is about equal to or exceeds the set temperature $T_s$ and/or the difference between the threshold temperature $T_t$ and the third temperature offset $CF_3$. Sealed system 120 may also be activated or operated at step 380 in order to assist with heating water within interior volume 114 of tank 112.

At step 390, controller 150 operates or activates lower heating element 119 (e.g., and deactivates upper heating element 118) to assist with heating water within interior volume 114 of tank 112. Controller 150 can continue to operate lower heating element 119 at step 390 until the temperature $T_m$ of water within interior volume 114 of tank 112 is about equal to or exceeds the threshold temperature $T_t$ and/or the set temperature $T_s$. Sealed system 120 may also be activated or operated at step 360 in order to assist with heating water within interior volume 114 of tank 112.

After step 390, sealed system 120 is operated at step 330 until water within interior volume 114 of tank 112 reaches the set temperature $T_s$. Similarly, if a small flow event has occurred and/or the temperature $T_m$ of water within interior volume 114 of tank 112 is less than the set temperature $T_s$ at step 370, sealed system 120 is operated in order to heat water within interior volume 114 of tank 112 at step 330. As discussed above, upper heating element 118 and lower heating element 119 are deactivated or turned off at step 330.

Figure 4:
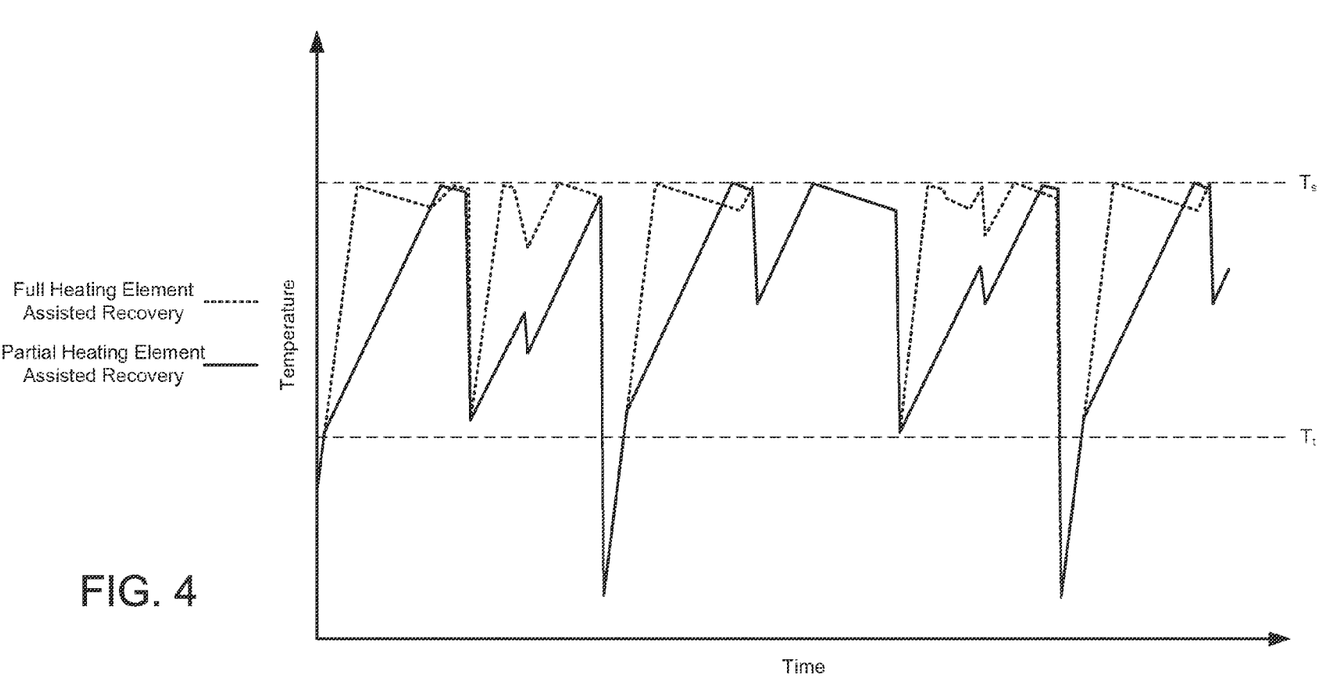
FIG. 4 provides plots of temperature of liquid water within a water heater appliance over time.

FIG. 4 provides plots of temperature of water within interior volume 114 of tank 112 over time. In particular, a plot of the temperature of water within interior volume 114 of tank 112 over time while operating water heater appliance 100 according to method 300 is shown (labeled "partial heating element assisted recovery") as well as a plot of the temperature of water within interior volume 114 of tank 112 over time while operating water heater appliance 100 according to another method (labeled "full heating element assisted recovery").

As may be seen in FIG. 4, when the temperature $T_m$ of water within interior volume 114 of tank 112 is less than the threshold temperature $T_t$, sealed system 120 and at least one of upper and lower heating elements 118 and 119 are operated to heat water within interior volume 114 of tank 112 during the partial heating element assisted recovery. Conversely, when the temperature $T_m$ of water within interior volume 114 of tank 112 is greater than the threshold temperature $T_t$, only sealed system 120 is operated to heat water within interior volume 114 of tank 112 and upper and lower heating elements 118 and 119 are deactivated during the partial heating element assisted recovery. By operating sealed system 120 and at least one of upper and lower heating elements 118 and 119 when the temperature $T_m$ of water within interior volume 114 of tank 112 is less than the threshold temperature $T_t$, water within interior volume 114 of tank 112 can be heated quickly relative to using only sealed system 120. Conversely, by operating only sealed system 120 when the temperature $T_m$ of water within interior volume 114 of tank 112 exceeds the threshold temperature $T_t$, water within interior volume 114 of tank 112 can be heated efficiently and/or economically relative to using both sealed system 120 and at least one of upper and lower heating elements 118 and 119.

As may be seen in FIG. 4, when the temperature $T_m$ of water within interior volume 114 of tank 112 is less than the threshold temperature $T_t$, sealed system 120 and at least one of upper and lower heating elements 118 and 119 are operated to heat water within interior volume 114 of tank 112 during the full heating element assisted recovery. In addition, when the temperature $T_m$ of water within interior volume 114 of tank 112 is greater than the threshold temperature $T_t$, the sealed system 120 and at least one of upper and lower heating elements 118 and 119 continue to operate and heat water within interior volume 114 of tank 112 during the full heating element assisted recovery. Thus, both the sealed system 120 and at least one of upper and lower heating elements 118 and 119 are operated until the set temperature is reached during the full heating element assisted recovery. By utilizing at least one of upper and lower heating elements 118 and 119 more, the full heating element assisted recovery is less efficient than the partial heating element assisted recovery. In particular, if the threshold temperature $T_t$ is one hundred and twenty degrees Fahrenheit and the set temperature $T_s$ is one hundred and seventy degrees Fahrenheit, the partial heating element assisted recovery is about fifty percent more efficient than the full heating element assisted recovery. As another example, if the threshold temperature $T_t$ is one hundred and twenty degrees Fahrenheit and the set temperature $T_s$ is one hundred and forty degrees Fahrenheit, the partial heating element assisted recovery is about twenty-five percent more efficient than the full heating element assisted recovery.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they include structural elements that do not differ from the literal language of the claims, or if they include equivalent structural elements with insubstantial differences from the literal languages of the claims.

What is claimed is:

1. A method for operating a water heater appliance during a hybrid heating mode, comprising:
measuring a temperature of water within the water heater appliance;
operating a heating element of the water heater appliance when the temperature of water within the water heater appliance is less than a threshold temperature at said step of measuring, wherein a set temperature is greater than the threshold temperature, a compressor of the sealed system of the water heater appliance turned off while operating the heating element of the water heater appliance;

deactivating the heating element of the water heater appliance when the temperature of water within the water heater appliance exceeds the threshold temperature after said step of operating;

activating a compressor of a sealed system of the water heater appliance after deactivating the heating element of the water heater appliance; and turning off the compressor of the sealed system of the water heater appliance when the temperature of water within the water heater appliance is about the set temperature after said step of activating, wherein the set temperature is no less than one hundred and forty degrees Fahrenheit, and the threshold temperature is no less than one hundred and twenty degrees Fahrenheit and no greater than one hundred and twenty-five degrees Fahrenheit.

2. The method of claim 1, wherein the heating element is an upper heating element, the method further comprising working a lower heating element of the water heater appliance before said step of operating if a large volume of water is dispensed from the water heater appliance.

3. The method of claim 2, wherein the large volume of water is greater than about ten gallons of water dispensed from the water heater appliance over a period of about ten minutes.

4. The method of claim 1, wherein said step of operating comprises operating the heating element of the water heater appliance if the temperature of water within the water heater appliance is less than the threshold temperature at said step of measuring and the temperature of water within the water heater appliance is less than a difference between the set temperature and a temperature offset at said step of measuring.

5. The method of claim 4, wherein the temperature offset from the set temperature is about thirty degrees Fahrenheit.

6. The method of claim 1, wherein said step of deactivating comprises deactivating the heating element of the water heater appliance when the temperature of water within the water heater appliance exceeds the threshold temperature after said step of operating or the temperature of water within the water heater appliance exceeds a difference between the set temperature and a temperature offset after said step of operating.

7. The method of claim 6, wherein the temperature offset from the threshold temperature is about seven degrees Fahrenheit.

* * * * *